United States Patent
Liu (10) Patent No.: US 9,709,831 B2
(45) Date of Patent: Jul. 18, 2017

(54) ELECTRONIC WINDOW AND THE CONTROL METHOD OF THE SAME

(71) Applicant: BOE Technology Group Co., Ltd., Beijing (CN)

(72) Inventor: Guanghui Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/769,168

(22) PCT Filed: Oct. 24, 2014

(86) PCT No.: PCT/CN2014/089437
§ 371 (c)(1),
(2) Date: Aug. 20, 2015

(87) PCT Pub. No.: WO2016/011718
PCT Pub. Date: Jan. 28, 2016

(65) Prior Publication Data
US 2016/0266417 A1   Sep. 15, 2016

(30) Foreign Application Priority Data

Jul. 22, 2014  (CN) .......................... 2014 1 0350134

(51) Int. Cl.
*G02B 27/28* (2006.01)
*G02F 1/03* (2006.01)
(Continued)

(52) U.S. Cl.
CPC .............. *G02F 1/0311* (2013.01); *E06B 9/24* (2013.01); *G02B 27/283* (2013.01); *G02F 1/01* (2013.01);
(Continued)

(58) Field of Classification Search
CPC ... G02B 1/00; G02B 1/08; G02B 5/20; G02B 5/207; G02B 5/30; G02B 5/3008;
(Continued)

(56) References Cited

U.S. PATENT DOCUMENTS

| 2001/0003473 | A1* | 6/2001 | Galabova ............... B82Y 15/00 349/98 |
| 2011/0211345 | A1 | 9/2011 | De Boer et al. |
| 2014/0340728 | A1* | 11/2014 | Taheri .................. G02B 27/281 359/250 |

FOREIGN PATENT DOCUMENTS

| CN | 101542574 A | 9/2009 |
| CN | 101750760 A | 6/2010 |
| CN | 103364985 A | 10/2013 |

OTHER PUBLICATIONS

Apr. 28, 2015—International Search Report Appn PCT/CN2014/089437 with Eng Tran of Written Opinion.

* cited by examiner

*Primary Examiner* — Scott J Sugarman
*Assistant Examiner* — Robert E Tallman
(74) *Attorney, Agent, or Firm* — Banner & Witcoff, Ltd.

(57) ABSTRACT

An electronic window is disclosed. The electronic window comprises: base substrate, first polarizing device, and second polarizing device disposed on the same side or on different sides of the base substrate; in an OFF state, first polarizing device configured to convert an incident light into a first polarized light and emitting the first polarized light, a polarization direction of the first polarized light is perpendicular to a polarization direction of the second polarizing device, and the second polarizing device configured to prevent the first polarized light from emitting; and in an ON state, first polarizing device configured to transmit the incident light, the second polarizing device configured to (Continued)

transmit the incident light or to convert the incident light into a third polarized light and emit the third polarized light, a polarization direction of the third polarized light is the same as a polarization direction of the second polarizing device.

18 Claims, 3 Drawing Sheets

(51) Int. Cl.
*G02F 1/01* (2006.01)
*E06B 9/24* (2006.01)

(52) U.S. Cl.
CPC .......... *G02F 1/0136* (2013.01); *G02F 1/0327* (2013.01); *E06B 2009/2417* (2013.01); *E06B 2009/2464* (2013.01)

(58) Field of Classification Search
CPC .. G02B 5/3016; G02B 5/3025; G02B 5/3033; G02B 5/3041; G02B 5/3058; G02B 5/3066; G02B 5/3083
USPC .............. 359/237, 238, 240, 245, 246, 250, 359/252–255, 290, 295, 321, 322
See application file for complete search history.

ELECTRONIC WINDOW AND THE CONTROL METHOD OF THE SAME

The application is a U.S. National Phase Entry of International Application No. PCT/CN2014/089437 filed on Oct. 24, 2014, designating the United States of America and claiming priority to Chinese Patent Application No. 201410350134.6 filed on Jul. 22, 2014. The present application claims priority to and the benefit of the above-identified applications and the above-identified applications are incorporated by reference herein in their entirety.

TECHNICAL FIELD

Embodiments of the present invention relate to an electronic window and a control method of the same.

BACKGROUND

A traditional curtain is typically made of textile material, and the curtain is usually separated from the window. With the development of science and technology, demand of home life and automotive and other areas for a controllable electronic window is growing. The electronic window is generally a mechanical transmission type electronic window, the mechanical transmission type electronic window controlling the shutters in a mechanical manner, in order to achieve the purpose of automatically controlling an electronic window switch.

With development of the display technology, another kind of electronic window made of an electrochromic material or liquid crystal material is more and more widely used. This electronic window changes the light flux of the window by causing the color of the electrochromic material to change in a case of applying voltage or causing the the liquid crystal molecules to twist in a case of applying voltage, so as to achieve the purpose of controlling the electronic window to be ON/OFF.

SUMMARY

Embodiments of the present invention provide an electronic window and a control method of the same.

At least one embodiment according to the present invention provides an electronic window, comprising: a base substrate and a first polarizing device and a second polarizing device disposed on the same side or on different sides of the base substrate;

in an OFF state, the first polarizing device configured to convert an incident light into a first polarized light and to emit the first polarized light, a polarization direction of the first polarized light is perpendicular to a polarization direction of the second polarizing device so as to prevent the first polarized light from emitting; and in an ON state, the first polarizing device configured to transmit the incident light, the second polarizing device configured to transmit the incident light or to convert the incident light into a third polarized light and emit the third polarized light, a polarization direction of the third polarized light is the same as the polarization direction of the second polarizing device.

In one example, the first polarizing device comprises a first conductive layer and a second conductive layer disposed opposite to each other, a first electro-optic crystal layer and a first optical material layer are disposed between the first conductive layer and the second conductive layer, the first electro-optic crystal layer is disposed on the first conductive layer, and the first optical material layer is disposed on the electro-optic crystal layer;

in the OFF state, a first voltage is applied between the first conductive layer and the second conductive layer, the first electro-optic crystal layer is configured to convert the incident light into the first polarized light and the second polarized light under the first voltage, a polarization direction of the second polarized light being the same as the polarization direction of the second polarizing device, and the first optical material layer is configured to refract the first polarized light and emit the refracted first polarized light and to reflect the second polarized light so as to reflect the second polarized light back to the first electro-optic crystal layer; and in the ON state, no voltage is applied between the first conductive layer and the second conductive layer, the first electro-optic crystal layer is configured to transmit the incident light into the first optical material layer, and the first optical material layer is configured to transmit the incident light.

In one example, a first power source is further comprised, and the first conductive layer and the second conductive layer are connected to the first power source via a first switch;

when the first switch is close, the first power source applies the first voltage between the first conductive layer and the second conductive layer; and when the first switch is open, the first power source does not apply a voltage between the first conductive layer and the second conductive layer.

In one example, an included angle of the interface between the first electro-optic crystal layer and the first optical material layer and the horizontal plane is a first set angle.

In one example, material for the first optical material layer comprises a crystal or a polymer material, the crystal comprising an electro-optic crystal or a non electro-optic crystal.

In one example, the second polarizing device is a polaroid;

in the ON state, the second polarizing device is configured to convert the incident light into the third polarized light and emit the third polarized light.

In one example, the second polarizing device comprises a third conductive layer and a fourth conductive layer disposed opposite to each other, a second electro-optic crystal layer and a second optical material layer are disposed between the third conductive layer and the fourth conductive layer, the second electro-optic crystal layer is disposed on the third conductive layer, and the second optical material layer is disposed on the second electro-optic crystal layer;

in the OFF state, a second voltage is applied between the third conductive layer and the fourth conductive layer, the second electro-optic crystal layer is configured to transmit the first polarized light into the second optical material layer under the second voltage, and the second optical material layer is configured to reflect the first polarized light so as to reflect the first polarized light back to the second electro-optic crystal layer; and in the ON state, no voltage is applied between the third conductive layer and the fourth conductive layer, the second electro-optic crystal layer is configured to transmit the incident light into the second optical material layer, and the second optical material layer is configured to transmit the incident light.

In one example, a second power source is further comprised, and the third conductive layer and the fourth conductive layer are connected to the second power source via a second switch;

when the second switch is close, the second power source applies the second voltage between the third conductive layer and the fourth conductive layer; and when the second switch is open, the second power source does not apply a voltage between the third conductive layer and the fourth conductive layer.

In one example, an included angle of the interface between the second electro-optic crystal layer and the second optical material layer and the horizontal plane is a second set angle.

In one example, material for the second optical material layer comprises a crystal or a polymer material, the crystal comprising an electro-optic crystal or a non electro-optic crystal.

Embodiments of the present invention further provide a control method of an electronic window, the electronic window comprising a base substrate and a first polarizing device and a second polarizing device disposed on the same side or on different sides of the base substrate;

the control method of the electronic window comprising:
in an OFF state, the first polarizing device converting an incident light into a first polarized light and emits the first polarized light, and the second polarizing device preventing the first polarized light from emitting, a polarization direction of the first polarized light being perpendicular to a polarization direction of the second polarizing device; and in an ON state, the first polarizing device transmitting the incident light, the second polarizing device transmitting the incident light or converts the incident light into a third polarized light and emitting the third polarized light, a polarization direction of the third polarized light being the same as the polarization direction of the second polarizing device.

DETAILED DESCRIPTION

In order to describe the present solution more clearly, the technical solutions of the present disclosure will be explained in detailed in connection with specific embodiments. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, technical terms or scientific terms as used herein should be construed as having general meanings which should be understood by those ordinary skilled in the art. Terms of "first", "second" and the like used in the description and the claims of the present application are not intended to indicate sequences, amounts or degree of importance, but are only for purpose of distinguishing various components. Likewise, terms of "one", "a" and "the" are not intended to limit the number, but indicate that there is at least one item. Words of "including" or "comprising" and the like mean that an element or an article before them contains an element/elements or an article/articles listed thereafter, while not excluding other elements or articles. Terms of "upper", "lower" and etc. are only intended to indicate relative positional relationship which can be correspondingly changed after an absolute position of the described object is changed.

The inventor of the present invention noted that a electronic window has the following technical problems:

the electronic window contains liquid crystal materials or chemical materials, and the glass substrate of the electronic window is made of a material easy to be broken, once the glass substrate is broken, liquid crystal materials or chemical materials with high toxicity will leak, which will do obvious harm to the environment and human body, thus making the electronic window less secure;

in the case of applying voltage, changes occurred in liquid crystal materials or chemical materials in the electronic window belong to molecular motions, since the response speed of molecules in liquid crystal materials or chemical materials will be significantly affected by temperature, the movement speed of the molecules becomes slower when the temperature is low, resulting in the response speed of the electronic window becoming slower as well, thus decreasing the switching speed between the ON/OFF states of the electronic window.

An electronic window and a control method for the same according to the present disclosure will be described in detail in combination with the drawings hereinafter.

Figure 1:
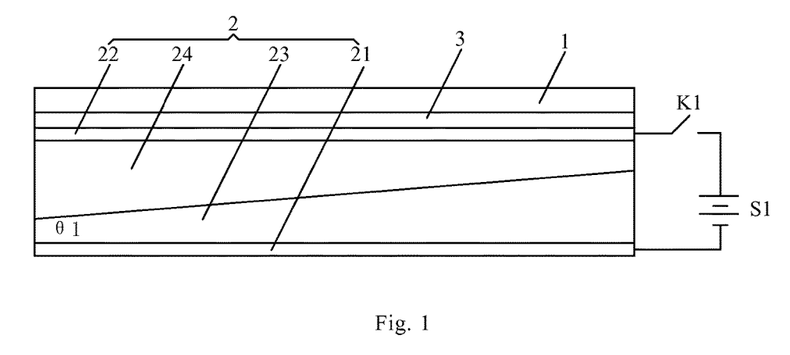
FIG. 1 is a structural schematic diagram of an electronic window according to embodiment I of the present disclosure.

FIG. 1 is a structural schematic diagram of an electronic window according to a first embodiment of the present disclosure. As illustrated in FIG. 1, the electronic window comprises a base substrate 1 and a first polarizing device 2 and a second polarizing device 3 disposed on the same side of the base substrate 1.

In this embodiment, the first polarizing device 2 and the second polarizing device 3 are both disposed on the light incoming side of the base substrate 1, and the second polarizing device 3 is disposed on the light outgoing side of the first polarizing device 2. Optionally, both the first polarizing device and the second polarizing device can also be disposed on the light emergent side of the base substrate, which is not illustrated. Optionally, the first polarizing device and the second polarizing device can also be disposed on different sides of the base substrate respectively, this case can be seen in the second embodiment as follows.

Figure 2A:
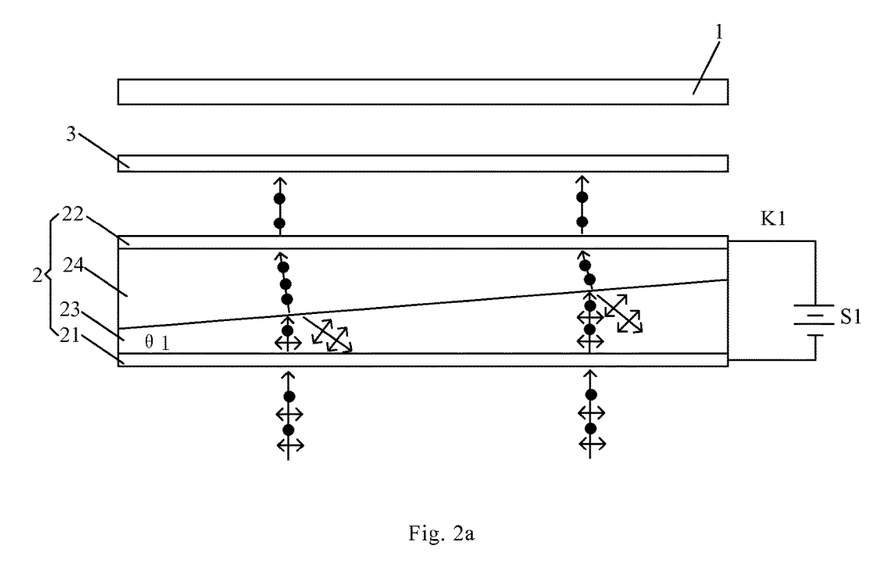
FIG. 2a is an optical path diagram of the light when the electronic window in FIG. 1 is in the closed state.
Figure 2B:
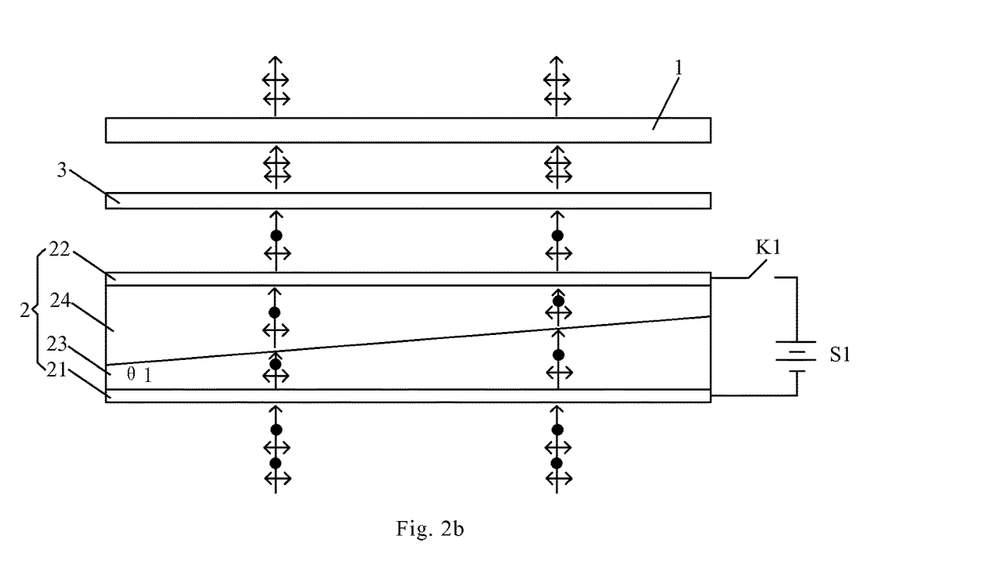
FIG. 2b is an optical path diagram of the light when the electronic window in FIG. 1 is in the open state.

As illustrated in FIG. 2a, in an OFF state, the first polarizing device 2 is configured to convert an incident light into a first polarized light and to emit the first polarized light, the polarization direction of the first polarized light is perpendicular to the polarization direction of the second polarizing device 3, and the second polarizing device 3 is configured to block the first polarized light. As illustrated in FIG. 2b, in an ON state, the first polarizing device 2 is configured to transmit the incident light, the second polarizing device 3 is configured to convert the incident light into a third polarized light and emit the third polarized light, and the polarization direction of the third polarized light is the same as the polarization direction of the second polarizing device 3. In this specification, the ON state can also be referred to as a transmissive state, and the OFF state can also be referred to as an opaque state.

In this embodiment, the first polarizing device 2 can comprise a first conductive layer 21 and a second conductive layer 22 disposed opposite to each other, a first electro-optic crystal layer 23 and a first optical material layer 24 are disposed between the first conductive layer 21 and the second conductive layer 22, the first electro-optic crystal layer 23 is disposed on the first conductive layer 21, and the first optical material layer 24 is disposed on the electro-optic crystal layer 23.

In this embodiment, for example, an interface between the first electro-optic crystal layer 23 and the first optical material layer 24 is an inclined plane, and an included angle of the interface between the first electro-optic crystal layer 23 and the first optical material layer 24 and the horizontal plane is a first set angle θ1. That is, the side of the first electro-optic crystal layer 23 adjacent to the first optical material layer 24 is an inclined plane, and the included angle of the inclined plane and the horizontal plane is the first set angle θ1; the side of the first optical material layer 24 adjacent to the first electro-optic crystal layer 23 is an inclined plane, and the included angle of the inclined plane and the horizontal plane is the first set angle θ1. The interface between the first electro-optic crystal layer 23 and the first optical material layer 24 is the plane formed by the side of the first electro-optic crystal layer 23 adjacent to the first optical material layer 24 contacting with the side of the first optical material layer 24 adjacent to the first electro-optic crystal layer 23.

In this embodiment, the material of the first electro-optic crystal layer 23 is an electro-optic crystal which for example can include: KDP(KH$_2$PO$_4$, potassium dihydrogen phosphate), ADP(NH$_4$H$_2$PO$_4$, ammonium dihydrogen phosphate), KDA(KH$_2$AsO$_4$, potassium dihydrogen arsenate) or KD*P(KD$_2$PO$_4$, potassium dideuterium phosphate). Since the first electro-optic crystal layer 23 can adopt different electro-optic materials, the first set angle θ1 can be set on the basis of the refractive index of the material of the first electro-optic crystal layer 23.

In this embodiment, the material of the first optical material layer 24 can include a crystal or a polymer material, the crystal can include an electro-optic crystal or a non electro-optic crystal. The non electro-optic crystal refers to a common crystal.

In this embodiment, the materials of the first conductive layer 21 and the second conductive layer 22 can both include indium tin oxide (ITO), fluorine doped tin oxide (FTO) or graphene.

In this embodiment, material of the base substrate 1 can include glass or sapphire.

In this embodiment, the second polarizing device 3 can be a polaroid. The polarization direction of the second polarizing device 3 can be set to any direction. This embodiment will be described by taking the polarization direction of the second polarizing device 3 parallel to the direction of the paper as an example.

Further, for example, the electronic window can also comprise a first power source S1, and the first conductive layer 21 and the second conductive layer 22 which can be connected to the first power source S1 through a first switch K1. Optionally, the first conductive layer 21 is connected to the positive electrode of the first power source S1 through the first switch K1, and the second conductive layer 22 is connected to the negative electrode of the first power source S1. When the first switch K1 is closed, the first power source S1 can apply the first voltage between the first conductive layer 21 and the second conductive layer 22, and the first voltage can be a half-wave voltage. When the first switch K1 is open, the first power source S1 does not apply a voltage between the first conductive layer 21 and the second conductive layer 22. The first polarizing device 2 can be equivalent to a first capacitor, that is, being equivalent to a first capacitor formed between the first conductive layer 21 and the second conductive layer 22, when the first switch K1 is close, the first capacitor applies the first voltage.

FIG. 2a is an optical path diagram of the light when the electronic window in FIG. 1 is in the OFF state. As illustrated in FIGS. 1 and 2a, in the OFF state, the first voltage is applied between the first conductive layer 21 and the second conductive layer 22, for example, when the first switch K1 is close, the first power source S1 applies the first voltage between the first conductive layer 21 and the second conductive layer 22, and the first voltage is a half-wave voltage, at this time the first electro-optic crystal layer 23 is a birefringent crystal. The first electro-optic crystal layer 23 is configured to convert the incident light into a first polarized light and a second polarized light under the first voltage. The polarization direction of the first polarized light is perpendicular to the polarization direction of the second polarizing device 3, and the polarization direction of the second polarized light is the same as the polarization direction of the second polarizing device 3. In this embodiment, the polarization direction of the first polarizing device 2 is the direction perpendicular to the paper (indicated by "●" in the figure), so the polarization direction of the first polarized light is the direction perpendicular to the paper (indicated by "●" in the figure), and the polarization direction of the second polarized light is the direction parallel to the paper (indicated by "⟵⟶" in the figure), and the first electro-optic crystal layer 23 emits the first polarized light and the second polarized light to the first optical material layer 24. The first optical material layer 24 is configured to refract the first polarized light and emit the refracted first polarized light and to reflect the second polarized light so as to reflect the second polarized light back to the first electro-optic crystal layer 23. The first optical material layer 24 emit the refracted first polarized light to the second polarizing device 3, and the second optical material layer 34 totally reflects the second polarized light so as to reflect the second polarized light back to the first electro-optic crystal layer 23. The second polarizing device 3 is configured to prevent the first polarized light from emitting. For example, since the polarization direction of the first polarized light is perpendicular to the polarization direction of the second polarizing device 3, the first polarized light cannot pass through the second polarizing device 3, making the electronic window in the OFF state.

FIG. 2b is an optical path diagram of the light when the electronic window in FIG. 1 is in the ON state. As illustrated in FIGS. 1 and 2b, in the ON state, no voltage is applied between the first conductive layer 21 and the second conductive layer 22, for example, when the first switch K1 is open, the first power source S1 does not apply a voltage between the first conductive layer 21 and the second conductive layer 22, at this time the first electro-optic crystal layer 23 is a common crystal; the first electro-optic crystal layer 23 is configured to transmit the incident light into the first optical material layer 24. During this course, the first electro-optic crystal layer 23 does not convert the incident light into a polarized light. The first optical material layer 24 is configured to transmit the incident light. For example, the first optical material layer 24 transmits the incident light into the second polarizing device 3; and the second polarizing device 3 is configured to convert the incident light into a third polarized light and emit the third polarized light, the polarization direction of the third polarized light is the same as the polarization direction of the second polarizing device 3; the base substrate 1 transmits the third polarized light emitted by the second polarizing device 3, making the electronic window in the ON state.

The first polarizing device in this embodiment comprises the first electro-optic crystal layer and the first optical material layer, the first electro-optic crystal layer will produce a birefringence phenomenon under the effect of the electric field generated by the first voltage, moreover, in combination with the optical prism effect of the first optical material layer, will cause the first polarizing device to achieve the effect of an adjustable polaroid. And an effect of controlling the light flux of the electronic window is achieved through combination with an common polaroid, so as to achieve the purpose of controlling the electronic window to be ON/OFF.

In the technical solution of the electronic window according to this embodiment, the electronic window comprises the first polarizing device and the second polarizing device, the first polarizing device converts the incident light into the first polarized light and the second polarizing device prevent the first polarized light from emitting in the OFF state; and the first polarizing device transmits the incident light and the second polarizing device converts the incident light into the third polarized light and emit the third polarized light in the ON state. The electronic window according to this embodiment utilizes two polarizing devices to control the electronic window to be ON/OFF, and there is no need to adopt liquid crystal materials or chemical materials, thereby improving safety of the electronic window. The electronic window according to this embodiment utilizes two polarizing devices to control the electronic window to be ON/OFF, the polarizing devices control the electronic window to be ON/OFF by means of the polarized light, so that the polarizing devices are not affected by the temperature, causing the switching speed between the ON state and the OFF state of the electronic window to be relatively high at a lower temperature.

Figure 3:
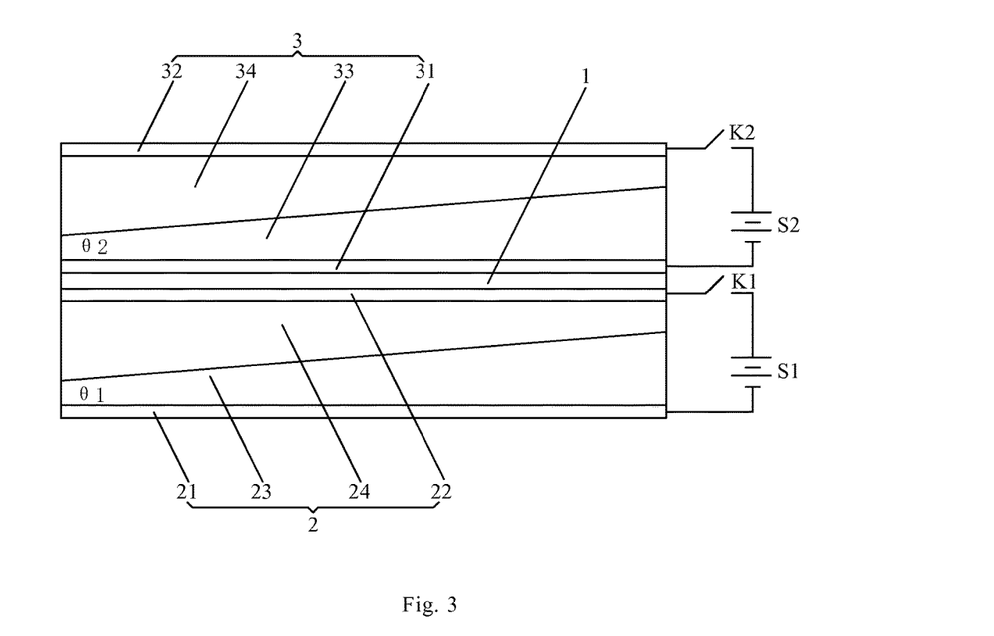
FIG. 3 is a structural schematic diagram of the electronic window according to embodiment II of the present disclosure.

FIG. 3 is a structural schematic diagram of the electronic window according to a second embodiment of the present disclosure. As illustrated in FIG. 3, the electronic window comprises a base substrate 1 and a first polarizing device 2 and a second polarizing device 3 locating on different sides of the base substrate 1.

In this embodiment, the first polarizing device 2 is disposed on the light incident side of the base substrate 1, and the second polarizing device 3 is disposed on the light outgoing side of the base substrate 1. In the OFF state, the first polarizing device 2 is configured to convert an incident light into a first polarized light and to emit the first polarized light, the polarization direction of the first polarized light is perpendicular to the polarization direction of the second polarizing device 3, and the second polarizing device 3 is configured to prevent the first polarized light from emitting. In the ON state, the first polarizing device 2 is configured to transmit the incident light, and the second polarizing device 3 is configured to transmit the incident light.

In this embodiment, the first polarizing device 2 can comprise a first conductive layer 21 and a second conductive layer 22 disposed opposite each other, a first electro-optic crystal layer 23 and a first optical material layer 24 are disposed between the first conductive layer 21 and the second conductive layer 22, the first electro-optic crystal layer 23 is disposed on the first conductive layer 21, and the first optical material layer 24 is disposed on the electro-optic crystal layer 23.

In this embodiment, for example, an interface between the first electro-optic crystal layer 23 and the first optical material layer 24 is an inclined plane, an included angle of the interface between the first electro-optic crystal layer 23 and the first optical material layer 24 and the horizontal plane is a first set angle $\theta 1$. That is, the side of the first electro-optic crystal layer 23 adjacent to the first optical material layer 24 is an inclined plane, and the included angle of the inclined plane and the horizontal plane is the first set angle $\theta 1$; the side of the first optical material layer 24 adjacent to the first electro-optic crystal layer 23 is an inclined plane, and the included angle of the inclined plane and the horizontal plane is the first set angle $\theta 1$. The interface between the first electro-optic crystal layer 23 and the first optical material layer 24 is the plane formed by the side of the first electro-optic crystal layer 23 adjacent to the first optical material layer 24 contacting with the side of the first optical material layer 24 adjacent to the first electro-optic crystal layer 23.

In this embodiment, the material of the first electro-optic crystal layer 23 is an electro-optic crystal which for example can comprise: KDP ($KH_2PO_4$, potassium dihydrogen phosphate), ADP ($NH_4H_2PO_4$, ammonium dihydrogen phosphate), KDA ($KH_2AsO_4$, potassium dihydrogen arsenate) or KD*P ($KD_2PO_4$, potassium dideuterium phosphate).

In this embodiment, the material of the first optical material layer 24 can comprise a crystal or a polymer material, the crystal can comprise an electro-optic crystal or a non electro-optic crystal. The non electro-optic crystal refers to a common crystal.

In this embodiment, the materials of the first conductive layer 21 and the second conductive layer 22 can both comprise ITO, FTO or graphene.

In this embodiment, the material of the base substrate 1 can comprise a glass or a sapphire.

In this embodiment, the second polarizing device 3 can comprise a third conductive layer 31 and a fourth conductive layer 32 disposed opposite to each other, a second electro-optic crystal layer 33 and a second optical material layer 34 are disposed between the third conductive layer 31 and the fourth conductive layer 32, the second electro-optic crystal layer 33 is disposed on the third conductive layer 31, and the second optical material layer 34 is disposed on the second electro-optic crystal layer 33.

In this embodiment, for example, an interface between the second electro-optic crystal layer 33 and the second optical material layer 34 is an inclined plane, an included angle of the interface between the second electro-optic crystal layer 33 and the second optical material layer 34 and the horizontal plane is a second set angle $\theta 2$. That is, the side of the second electro-optic crystal layer 33 adjacent to the second optical material layer 34 is an inclined plane, and the included angle of the inclined plane and the horizontal plane is the second set angle $\theta 2$; the side of the second optical material layer 34 adjacent to the second electro-optic crystal layer 33 is an inclined plane, and the included angle of the inclined plane and the horizontal plane is the second set angle $\theta 2$. The interface between the second electro-optic crystal layer 33 and the second optical material layer 34 is the plane formed by the side of the second electro-optic crystal layer 33 adjacent to the second optical material layer 34 contacting with the side of the second optical material layer 34 adjacent to the second electro-optic crystal layer 33.

In this embodiment, the material of the second electro-optic crystal layer 33 is an electro-optic crystal which for example can comprise: KDP ($KH_2PO_4$, potassium dihydrogen phosphate), ADP ($NH_4H_2PO_4$, ammonium dihydrogen phosphate), KDA ($KH_2AsO_4$, potassium dihydrogen arsenate) or KD*P ($KD_2PO_4$, potassium dideuterium phosphate). Since the second electro-optic crystal layer 33 can adopt different electro-optic materials, the second set angle θ2 can be set according to the refractive index of the material of the second electro-optic crystal layer 33.

In this embodiment, the material of the second optical material layer 34 can comprise a crystal or a polymer material, the crystal can include an electro-optic crystal or a non electro-optic crystal. The non electro-optic crystal refers to a common crystal.

In this embodiment, the materials of the third conductive layer 31 and the fourth conductive layer 32 can both comprise ITO, FTO or graphene.

Further, for example, the first conductive layer 21 and the second conductive layer 22 can be connected to the first power source S1 through a first switch K1. Optionally, the first conductive layer 21 is connected to the positive electrode of the first power source S1 through the first switch K1, and the second conductive layer 22 is connected to the negative electrode of the first power source S1. When the first switch K1 is close, the first power source S1 can apply a first voltage between the first conductive layer 21 and the second conductive layer 22, and the first voltage can be a half-wave voltage. When the first switch K1 is open, no voltage is applied between the first conductive layer 21 and the second conductive layer 22. The first polarizing device 2 can be equivalent to a first capacitor, that is, being equivalent to the first capacitor formed between the first conductive layer 21 and the second conductive layer 22, when the first switch K1 is close, the first capacitor applies the first voltage.

Further, for example, the electronic window can also comprise a second power source S2, and the third conductive layer 31 and the fourth conductive layer 32 can be connected to the second power source S2 through a second switch K2. Optionally, the third conductive layer 31 is connected to the positive electrode of the second power source S2 through the second switch K2, and the fourth conductive layer 32 is connected to the negative electrode of the second power source S2. When the second switch K2 is close, the second power source S2 can apply the second voltage between the third conductive layer 31 and the fourth conductive layer 32, and the second voltage can be a half-wave voltage. When the second switch K2 is open, the second power source S2 does not apply a voltage between the third conductive layer 31 and the fourth conductive layer 32. The second polarizing device 3 can be equivalent to a second capacitor, that is, being equivalent to a second capacitor formed between the third conductive layer 31 and the fourth conductive layer 32, when the second switch K2 is close, the second capacitor applies the second voltage.

Figure 4A:
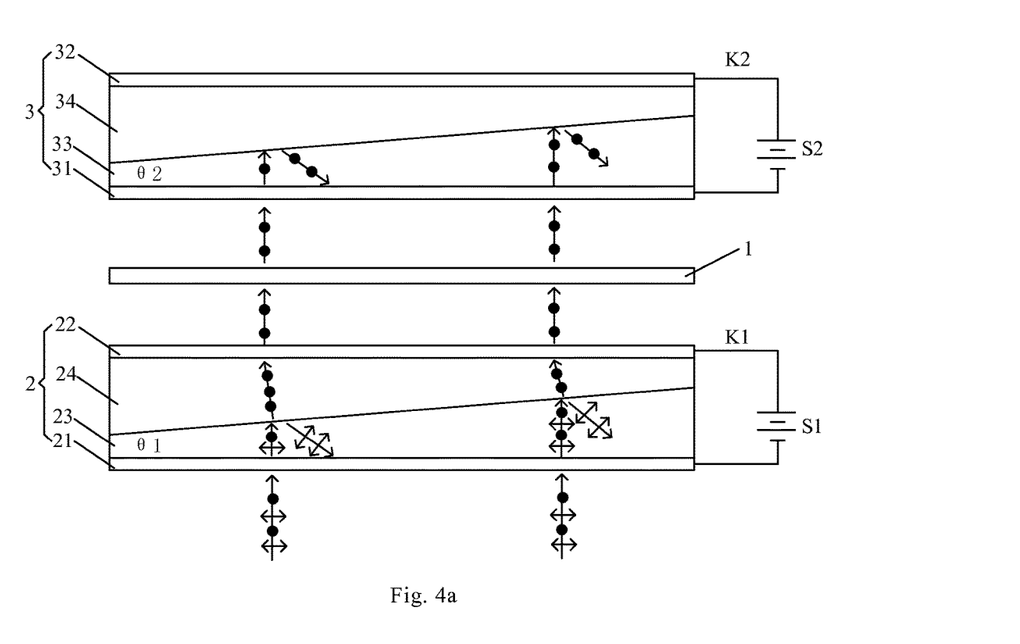
FIG. 4a is an optical path diagram of the light when the electronic window in FIG. 3 is in the closed state.

FIG. 4a is an optical path diagram of the light when the electronic window in FIG. 3 is in the OFF state. As illustrated in FIGS. 3 and 4a, in the OFF state, the first voltage is applied between the first conductive layer 21 and the second conductive layer 22, for example, when the first switch K1 is close, the first power source S1 applies the first voltage between the first conductive layer 21 and the second conductive layer 22, and the first voltage can be a half-wave voltage, at this time the first electro-optic crystal layer 23 is a birefringent crystal. The first electro-optic crystal layer 23 is configured to convert the incident light into the first polarized light and the second polarized light under the first voltage. The polarization direction of the first polarized light is perpendicular to the polarization direction of the second polarizing device 3, and the polarization direction of the second polarized light is the same as the polarization direction of the second polarizing device 3. In this embodiment, the polarization direction of the first polarizing device 2 is the direction perpendicular to the paper (indicated by "●" in the figure), so the polarization direction of the first polarized light is the direction perpendicular to the paper (indicated by "●" in the figure), and the polarization direction of the second polarized light is the direction parallel to the paper (indicated by "⟵⟶" in the figure). The first electro-optic crystal layer 23 emits the first polarized light and the second polarized light to the first optical material layer 24. The first optical material layer 24 is configured to refract the first polarized light and emit the refracted first polarized light and to reflect the second polarized light so as to reflect the second polarized light back to the first electro-optic crystal layer 23. The first optical material layer 24 emit the refracted first polarized light to the base substrate 1, and the second optical material layer 34 takes total reflection of the second polarized light so as to reflect the second polarized light back to the first electro-optic crystal layer 23. The base substrate 1 transmits the first polarized light into the second polarizing device 3. The second voltage is applied between the third conductive layer 31 and the fourth conductive layer 32. For example, when the second switch K2 is close, the second power source S2 applies the second voltage between the third conductive layer 31 and the fourth conductive layer 32, and the second voltage can be the half-wave voltage, at this time the second electro-optic crystal layer 33 is a birefringent crystal. The second electro-optic crystal layer 33 is configured to transmit the first polarized light into the second optical material layer 34 under the second voltage. The second optical material layer 34 is configured to reflect the first polarized light so as to reflect the first polarized light back to the second electro-optic crystal layer 33. For example, The second optical material layer 34 is configured to totally reflect the first polarized light so as to reflect the first polarized light back to the second electro-optic crystal layer 33, therefore, the first polarized light cannot pass through the second polarizing device 3, making the electronic window in the OFF state.

Figure 4B:
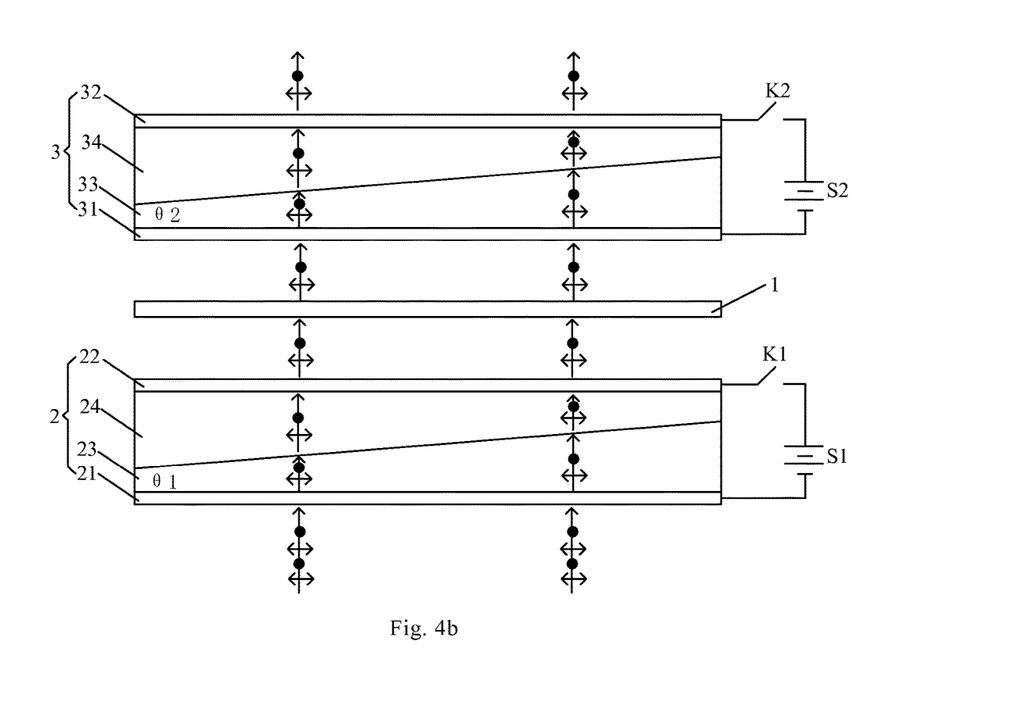
FIG. 4b is an optical path diagram of the light when the electronic window in FIG. 3 is in the open state.

FIG. 4b is an optical path diagram of the light when the electronic window in FIG. 3 is in the ON state. As illustrated in FIGS. 1 and 4b, in the ON state, no voltage is applied between the first conductive layer 21 and the second conductive layer 22. For example, when the first switch K1 is open, the first power source S1 does not apply a voltage between the first conductive layer 21 and the second conductive layer 22, at this time the first electro-optic crystal layer 23 is a common crystal, and the first electro-optic crystal layer 23 is configured to transmit the incident light into the first optical material layer 24. During this course, the first electro-optic crystal layer 23 does not convert the incident light into a polarized light, and the first optical material layer 24 is configured to transmit the incident light. For example, the second optical material layer 34 transmits the incident light into the base substrate 1; the base substrate 1 transmits the incident light into the second polarizing device 3; and no voltage is applied between the third conductive layer 31 and the fourth conductive layer 32. For example, when the second switch K2 is open, the second power source S2 does not apply the voltage between the third conductive layer 31 and the fourth conductive layer 32, at this time the second electro-optic crystal layer 33 is a common crystal, and the second electro-optic crystal layer 33 is configured to transmit the incident light into the second optical material layer 34. During this course, the second electro-optic crystal layer 33 does not convert the incident light into a polarized light, and the second optical material layer 34 is configured to transmit the incident light, thereby making the electronic window in the ON state.

The first polarizing device in this embodiment comprises the first electro-optic crystal layer and the first optical material layer, the first electro-optic crystal layer will produce a birefringence phenomenon under the effect of a electric field generated by the first voltage, moreover, in combination with the optical prism effect of the first optical material layer, will cause the first polarizing device to achieve the effect of an adjustable polaroid. And the effect of controlling the light flux of the electronic window is achieved through the combination with the second polarizing device also as the adjustable polaroid, so as to achieve the purpose of controlling the electronic window to be ON/OFF.

In the technical solution of the electronic window according to this embodiment, the electronic window comprises the first polarizing device and the second polarizing device, the first polarizing device converts the incident light into the first polarized light and the second polarizing device prevent the first polarized light from emitting in the OFF state; and the first polarizing device transmits the incident light and the second polarizing device transmits the incident light in an ON state. The electronic window according to this embodiment utilizes two polarizing devices to control the electronic window to be ON/OFF, and there is no need to adopt liquid crystal materials or chemical materials, thereby improving safety of the electronic window. The electronic window according to this embodiment utilizes two polarizing devices to control the electronic window to be ON/OFF, the polarizing device controls the electronic window to be ON/OFF by the polarized light, so that the polarizing device is not affected by the temperature, causing the switching speed between the ON state and the OFF state of the electronic window to be relatively high at a lower temperature.

The second polarizing device in this embodiment comprises the electro-optic crystal layer and the second optical material layer, whose transmittance is high, thereby greatly improving the flux of light of the electronic window.

Embodiment III of the present disclosure provides a control method of an electronic window, the electronic window comprising a base substrate and a first polarizing device and a second polarizing device locating on the same side or on different sides of the base substrate. The control method of the electronic window comprises:

step 101: in an OFF state, the first polarizing device converts an incident light into a first polarized light and emits the first polarized light, and the second polarizing device prevent the first polarized light from emitting, a polarization direction of the first polarized light being perpendicular to a polarization direction of the second polarizing device.

step 102: in an ON state, the first polarizing device transmits the incident light, the second polarizing device transmits the incident light or converts the incident light into a third polarized light and emits the third polarized light, a polarization direction of the third polarized light being the same as the polarization direction of the second polarizing device.

In practical applications, performing order of the step 101 and step 102 can be changed.

The control method of the electronic window according to this embodiment can be used to control the electronic window according the above embodiment I or embodiment 2, and description relating to the electronic window can be seen in the above embodiment I or embodiment 2, which will not be repeated herein.

In the technical solution of the control method of the electronic window according to this embodiment, the electronic window comprises the first polarizing device and the second polarizing device, the first polarizing device converts the incident light into a first polarized light and the second polarizing device prevents the first polarized light from emitting in an OFF state, and the first polarizing device transmits the incident light and the second polarizing device transmits the incident light in an ON state. The electronic window according to this embodiment uses two polarizing devices to control the electronic window to be ON/OFF, and there is no need to adopt liquid crystal materials or chemical materials, thereby improving safety of the electronic window. The electronic window according to this embodiment utilizes two polarizing devices to control the electronic window to be ON/OFF, the polarizing device controls the electronic window to be ON/OFF by means of the polarized light, so that the polarizing device is not affected by the temperature, causing the switching speed between the ON/OFF states of the electronic window to be relatively high at a lower temperature.

The electronic window of the present disclosure can be applied to automobiles, electronic equipments or intelligent fixtures, which is more intelligent and convenient than the mechanical transmission type electronic window.

It should be understood that the above implementation is merely the exemplary embodiment used for explaining the principle of the present invention, but the present invention is not limited to this. It will occur to those of ordinary skill in the art that various modifications and improvements can be made without departing from the spirit and gist of the present invention and that such modifications and improvements are intended to be within the scope of the invention.

This disclosure claims the benefit of Chinese patent application No. 201410350134.6, filed Jul. 22, 2014, "An Electronic Window and A Control Method of The Same", the disclosure of which is hereby entirely incorporated by reference.

The invention claimed is:

1. An electronic window, comprising: a base substrate and a first polarizing device and a second polarizing device locating on the same side or on different sides of the base substrate, wherein the first polarizing device comprises a first conductive layer and a second conductive layer disposed opposite to each other, a first electro-optic crystal layer and a first optical material layer are disposed between the first conductive layer and the second conductive layer, the first electro-optic crystal layer is disposed on the first conductive layer, and the first optical material layer is disposed on the first electro-optic crystal layer;

in an OFF state, the electronic window configured to prevent an incident light from passing through, wherein a first voltage is applied between the first conductive layer and the second conductive layer, the first electro-optic crystal layer is configured to convert the incident light into a first polarized light and a second polarized light under the first voltage, a polarization direction of the first polarized light is perpendicular to a polarization direction of the second polarizing device, a polarization direction of the second polarized light being the same as the polarization direction of the second polarizing device, the first optical material layer is configured to refract the first polarized light and emit the refracted first polarized light and to reflect the second polarized light so as to reflect the second polarized light back to the first electro-optic crystal layer, the second polarizing device prevents the first polarized light from emitting; and in an ON state, the electronic window configured to enable the incident light to pass through, wherein the first polarizing device configured to transmit the incident light, no voltage is applied between the first conductive layer and the second conductive layer, the first electro-optic crystal layer is configured to transmit the incident light into the first optical material layer, and the first optical material layer is configured to transmit the incident light, the second polarizing device configured to transmit the incident light or to convert the incident light into a third polarized light and emit the third polarized light, a polarization direction of the third polarized light being the same as the polarization direction of the second polarizing device.

2. The electronic window according to claim 1, further comprising a first power source, and the first conductive layer and the second conductive layer are connected to the first power source via a first switch;

when the first switch is close, the first power source applies the first voltage between the first conductive layer and the second conductive layer; and when the first switch is open, the first power source does not apply a voltage between the first conductive layer and the second conductive layer.

3. The electronic window according to claim 1, wherein an included angle of the interface between the first electro-optic crystal layer and the first optical material layer and the horizontal plane is a first set angle.

4. The electronic window according to claim 1, wherein material for the first optical material layer comprise a crystal or a polymer material, the crystal comprising an electro-optic crystal or a non electro-optic crystal.

5. The electronic window according to claim 1, wherein the second polarizing device is a polaroid; and in the ON state, the second polarizing device is configured to convert the incident light into a third polarized light and emit the third polarized light.

6. The electronic window according to claim 1, wherein the second polarizing device comprises a third conductive layer and a fourth conductive layer disposed opposite to each other, a second electro-optic crystal layer and a second optical material layer are disposed between the third conductive layer and the fourth conductive layer, the second electro-optic crystal layer is disposed on the third conductive layer, and the second optical material layer is disposed on the second electro-optic crystal layer;

in the OFF state, a second voltage is applied between the third conductive layer and the fourth conductive layer, the second electro-optic crystal layer is configured to transmit the first polarized light into the second optical material layer under the second voltage, and the second optical material layer is configured to reflect the first polarized light so as to reflect the first polarized light back to the second electro-optic crystal layer; and in the ON state, no voltage is applied between the third conductive layer and the fourth conductive layer, the second electro-optic crystal layer is configured to transmit the incident light into the second optical material layer, and the second optical material layer is configured to transmit the incident light.

7. The electronic window according to claim 6, further comprising a second power source, and the third conductive layer and the fourth conductive layer are connected to the second power source via a second switch;

when the second switch is close, the second power source applies a second voltage between the third conductive layer and the fourth conductive layer; and when the second switch is open, the second power source does not apply a voltage between the third conductive layer and the fourth conductive layer.

8. The electronic window according to claim 6, wherein an included angle of the interface between the second electro-optic crystal layer and the second optical material layer and the horizontal plane is a second set angle.

9. The electronic window according to claim 6, wherein material for the second optical material layer comprise a crystal or a polymer material, the crystal comprising an electro-optic crystal or a non electro-optic crystal.

10. A control method of an electronic window, the electronic window comprising a base substrate and a first polarizing device and a second polarizing device disposed on the same side or on different sides of the base substrate, wherein the first polarizing device comprises a first conductive layer and a second conductive layer disposed opposite to each other, a first electro-optic crystal layer and a first optical material layer are disposed between the first conductive layer and the second conductive layer, the first electro-optic crystal layer is disposed on the first conductive layer, and the first optical material layer is disposed on the first electro-optic crystal layer;

the control method of the electronic window comprising:

in an OFF state, applying a first voltage between the first conductive layer and the second conductive layer, configuring the first electro-optic crystal layer to convert incident light into a first polarized light and a second polarized light under the first voltage, a polarization direction of the first polarized light is perpendicular to a polarization direction of the second polarizing device, a polarization direction of the second polarized light being the same as the polarization direction of the second polarizing device, configuring the first optical material layer to refract the first polarized light and emit the refracted first polarized light and to reflect the second polarized light so as to reflect the second polarized light back to the first electro-optic crystal layer, configuring the second polarizing device to prevent the first polarized light from emitting; and in an ON state, configuring the first polarizing device to transmit the incident light, wherein no voltage is applied between the first conductive layer and the second conductive layer, configuring the first electro-optic crystal layer to transmit the incident light into the first optical material layer, and configuring the first optical material layer to transmit the incident light, configuring the second polarizing device to transmit the incident light or to convert the incident light into a third polarized light and emit the third polarized light, a polarization direction of the third polarized light being the same as the polarization direction of the second polarizing device.

11. The electronic window according to claim 2, wherein an included angle of the interface between the first electro-optic crystal layer and the first optical material layer and the horizontal plane is a first set angle.

12. The electronic window according to claim 2, wherein material for the first optical material layer comprise a crystal or a polymer material, the crystal comprising an electro-optic crystal or a non electro-optic crystal.

13. The electronic window according to claim 3, wherein material for the first optical material layer comprise a crystal or a polymer material, the crystal comprising an electro-optic crystal or a non electro-optic crystal.

14. The electronic window according to claim 2, wherein the second polarizing device is a polaroid; and
in the ON state, the second polarizing device is configured to convert the incident light into a third polarized light and emit the third polarized light.

15. The electronic window according to claim 3, wherein the second polarizing device is a polaroid; and
in the ON state, the second polarizing device is configured to convert the incident light into a third polarized light and emit the third polarized light.

16. The electronic window according to claim 7, wherein an included angle of the interface between the second electro-optic crystal layer and the second optical material layer and the horizontal plane is a second set angle.

17. The electronic window according to claim 7, wherein material for the second optical material layer comprise a crystal or a polymer material, the crystal comprising an electro-optic crystal or a non electro-optic crystal.

18. The electronic window according to claim 8, wherein material for the second optical material layer comprise a crystal or a polymer material, the crystal comprising an electro-optic crystal or a non electro-optic crystal.

* * * * *